US008804646B2

(12) United States Patent
Tan

(10) Patent No.: US 8,804,646 B2
(45) Date of Patent: Aug. 12, 2014

(54) METHOD AND DEVICE FOR ALLOCATING CONTROL CHANNEL ELEMENT

(75) Inventor: Yuanchun Tan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 116 days.

(21) Appl. No.: 13/509,848

(22) PCT Filed: Mar. 10, 2010

(86) PCT No.: PCT/CN2010/070974
§ 371 (c)(1),
(2), (4) Date: May 15, 2012

(87) PCT Pub. No.: WO2010/148666
PCT Pub. Date: Dec. 29, 2010

(65) Prior Publication Data
US 2012/0236813 A1    Sep. 20, 2012

(30) Foreign Application Priority Data

Nov. 16, 2009    (CN) .......................... 2009 1 0223608

(51) Int. Cl.
*H04W 4/00*    (2009.01)
*H04W 72/04*    (2009.01)
*H04W 88/08*    (2009.01)
*H04W 76/00*    (2009.01)

(52) U.S. Cl.
CPC .............. *H04W 72/04* (2013.01); *H04W 88/08* (2013.01); *H04W 76/00* (2013.01)
USPC ....................................................... 370/329

(58) Field of Classification Search
CPC ...... H04W 72/04; H04W 88/08; H04W 76/00

USPC .......................................................... 370/329
See application file for complete search history.

(56) References Cited

U.S. PATENT DOCUMENTS

2011/0083066 A1 *   4/2011   Chung et al. .................. 714/807
2012/0063413 A1 *   3/2012   Kroener et al. ............... 370/330

FOREIGN PATENT DOCUMENTS

| WO | WO 2008/105316 | 9/2008 |
| WO | WO 2008/136616 | 11/2008 |
| WO | WO 2009/045047 | 4/2009 |

OTHER PUBLICATIONS

International Preliminary Report on Patentability issued in International Application No. PCT/CN2010/070974, issued May 22, 2012 (English Language Translation Provided) (8 pages).
International Search Report issued in International Application No. PCT/CN2010/070974, completed Jul. 29, 2010, mailed Aug. 26, 2010 (English Language Translation Provided) (6 pages).
Written Opinion of the International Searching Authority issued in International Application No. PCT/CN2010/070974, completed Aug. 12, 2010, mailed Aug. 26, 2010, (English Language Translation Provided) (6 pages).

* cited by examiner

*Primary Examiner* — Phuc Tran
(74) *Attorney, Agent, or Firm* — Clark & Elbing LLP

(57) ABSTRACT

A method and a device for allocating a Control Channel Element (CCE) are provided by the present invention. The method comprises: determining a CCE aggregation level, by a network, according to a mapping relationship between a Channel Quality Identity (CQI) and a Physical Downlink Control Channel (PDCCH) code rate; and allocating the CCE resource according to the CCE aggregation level by the network. By the method, the effect of improving the utilization rate of the CCE resource is achieved.

8 Claims, 6 Drawing Sheets

METHOD AND DEVICE FOR ALLOCATING CONTROL CHANNEL ELEMENT

CROSS-REFERENCE TO RELATED APPLICATIONS

This application is the U.S. National Stage filing under 35 U.S.C. §371 of International Application No. PCT/CN2010/070974, filed Mar. 10, 2010, which claims the benefit of Chinese Patent Application No. 200910223608.X, filed Nov. 16, 2009.

FIELD OF THE INVENTION

The present invention relates to communication field, and in particular to a method and a device for allocating a Control Channel Element (CCE).

BACKGROUND OF THE INVENTION

The Long-Term Evolution (LTE) is a long-term evolution technology. A Physical Downlink Control Channel (PDCCH) is composed of CCE and used for bearing Downlink Control Information (DCI). The CCE is divided into a public space CCE (hereafter referred to as a public CCE) and a private space CCE (hereafter referred to as a private CCE), wherein the public CCE comprises 16 CCEs from the $0^{th}$ CCE to the $15^{th}$ CCE, and the rest is the private CCE. The literature of the 3rd Generation Partnership Project (3GPP), TS36.213.8.7.0, stipulates that: for the DCI needing the public CCE, the CCE aggregation level L of 4 or 8 can only be used, wherein when the CCE aggregation level L is 4, the start position of the CCE is respectively at the $0^{th}$, the $4^{th}$, the $8^{th}$ or the $12^{th}$ CCE, and when the CCE aggregation level L is 8, the start position of the CCE is respectively at the $0^{th}$ or the $8^{th}$ CCE; and for the DCI needing the private CCE, the CCE occupied by and allocated to the DCI is determined by a Hash function which is related to subframe number, CCE sum, CCE aggregation level L, the number of PDCCH candidates $M^{(L)}$ and the Radio Network Temporary Identity (RNTI) of a User Equipment (UE). According to the literature of 3GPP TS36.212.8.7.0, the DCI comprises the DCI in the format 0, format 1, format 1A, format 1B, format 1C, format 1D, format 2, format 2A, format 3 and format 3A, wherein the DCI in the format 0 (hereafter referred to as DCI0) is used for the uplink authorization of a UE; and the DCI in the format 1, format 1A, format 1B, format 1C, format 1D, format 2 and format 2A (hereafter referred to as DCIx) is used for the downlink allocation of a UE.

Only the private CCE resource can be allocated to the DCI in the format 1, format 1B, format 1D, format 2 and format 2A; only the public CCE resource can be allocated to the DCI in the format 1C, format 3 and format 3A; and either the public CCE resource or private CCE resource may be allocated to the DCI in the format 0 and format 1A. The DCI in the format 1C, format 3, and format 3A is called the public DCI, which aims at all the UEs in a cell. The DCI of a single UE (comprising the DCI in the format 0, format 1, format 1A, format 1B, format 1D, format 2 and format 2A) is called the DCI of the UE (or the private DCI).

The Media Access Control (MAC) layer needs some ways for the allocation of the CCE resource.

At present, the technology about the allocation of the CCE resource comprises: judging the CCE aggregation level L used by the public DCI and the DCI of the UE according to the wideband Channel Quality Identity (CQI) and Reference Signal Receiving Power (RSRP) information reported by the UE, or determining the CCE aggregation level L used by the UE according to the quantity of DCIx and DCI0 to be scheduled and the CCE resource. These technologies have the following defects: for the allocation of the public CCE, how to allocate the idle CCE resource in the public CCE is not clear; and for the allocation of the private CCE, how to allocate the idle CCE resource in the number of PDCCH candidates $M^{(L)}$ is not clear. In addition, the DCI in the same format contains different bits in different cell downlink bandwidths, and the DCI in the same format contains fewer bits in the smaller cell downlink bandwidth, and vice versa.

SUMMARY OF THE INVENTION

The present invention is provided to solve the problems that the system performance is affected when the same DCI uses the same CCE aggregation level L in different cell bandwidths and how to allocate the idle CCE resource is not clear in the related art. Therefore, a solution for allocating a CCE is provided by the present invention to solve at least one of the problems.

According to one aspect of the present invention, a method for allocating a CCE is provided.

The method for allocating a CCE comprises: determining a CCE aggregation level, by a network, according to a mapping relationship between a Channel Quality Identity (CQI) and a Physical Downlink Control Channel (PDCCH) code rate; and allocating the CCE resource according to the CCE aggregation level by the network.

Preferably, the step of determining the CCE aggregation level by the network according to the mapping relationship comprises: selecting a corresponding first PDCCH code rate for public Downlink Control Information (DCI), by the network, according to the mapping relationship and a minimum wideband CQI of all the activated User Equipments (UEs) in a cell at a current Transmission Time Interval (TTI); and selecting a corresponding first CCE aggregation level from a CCE aggregation level set {4, 8} for the public DCI at the current TTI, by the network, according to the corresponding first PDCCH code rate, wherein the first CCE aggregation level corresponds to the first PDCCH code rate.

Preferably, the step of allocating the CCE resource according to the CCE aggregation level by the network comprises: extracting a piece of public DCI from a public DCI scheduling queue at the current TTI by the network, and allocating the CCE resource by using the first CCE aggregation level corresponding to the extracted public DCI by the network.

Preferably, the step of determining the CCE aggregation level according to the mapping relationship by the network comprises: selecting a corresponding second PDCCH code rate for a corresponding User Equipment (UE) according to the mapping relationship by the network; selecting a needed second CCE aggregation level for DCI of a CCE resource, which will be allocated to the UE at a current TTI, by the network, according to the corresponding second PDCCH code rate, wherein the second CCE aggregation level corresponds to the second PDCCH code rate; and selecting values greater than or equal to the second CCE aggregation level from a CCE aggregation level set {1, 2, 4, 8} as a CCE aggregation level set corresponding to the UE, by the network.

Preferably, the step of allocating the CCE resource according to the CCE aggregation level by the network comprises: extracting DCI of a UE from a UE scheduling queue at the current TTI by the network; and selecting a CCE aggregation level from a CCE aggregation level set corresponding to the extracted DCI of the UE to allocate the CCE resource to the extracted DCI of the UE by the network.

According to another aspect of the present invention, a device for allocating a CCE is provided.

The device for allocating a CCE is located in the network and comprises: a determining module, configured to determine a CCE aggregation level according to a mapping relationship between a CQI and a PDCCH code rate, and an allocating module, configured to allocate the CCE resource according to the CCE aggregation level.

Preferably, the determining module comprises: a first selecting sub-module, configured to select a corresponding first PDCCH code rate for public DCI according to the mapping relationship and a minimum wideband CQI of all the activated UEs in a cell at a current TTI; and a second selecting sub-module, configured to select a corresponding first CCE aggregation level from a CCE aggregation level set {4, 8} for the public DCI at the current TTI according to the corresponding first PDCCH code rate, wherein the first CCE aggregation level corresponds to the first PDCCH code rate.

Preferably, the allocating module comprises: a first extracting sub-module, configured to extract a piece of public DCI from a public DCI scheduling queue at the current TTI; and a first allocating sub-module, configured to allocate the CCE resource by using the first CCE aggregation level corresponding to the extracted public DCI.

Preferably, the determining module comprises: a third selecting sub-module, configured to select a corresponding second PDCCH code rate for a corresponding UE according to the mapping relationship; a fourth selecting sub-module, configured to select a needed second CCE aggregation level for the DCI of a CCE resource, which will be allocated to the UE at a current TTI, according to the corresponding second PDCCH code rate, wherein the second CCE aggregation level corresponds to the second PDCCH code rate; and a fifth selecting sub-module, configured to select values greater than or equal to the second CCE aggregation level from a CCE aggregation level set {1, 2, 4, 8} as a CCE aggregation level set corresponding to the UE.

Preferably, the allocating module comprises: a second extracting sub-module, configured to extract DCI of a UE from a UE scheduling queue at the current TTI; and a second allocating sub-module, configured to select a CCE aggregation level from a CCE aggregation level set corresponding to the extracted DCI of the UE to allocate the CCE resource to the extracted DCI of the UE.

Through the present invention, by means of the same DCI using different CCE aggregation levels L in different cell downlink bandwidths, the problems, that the system performance is affected when the same DCI uses the same CCE aggregation level L in different cell bandwidths and how to allocate the idle CCE resource is not clear in the related art, are solved, and thereby the effect of improving the utilization rate of the CCE resource is achieved.

BRIEF DESCRIPTION OF THE DRAWINGS

The drawings illustrated herein are used for providing a further understanding of the present invention and constituting one part of this application. The exemplary embodiments of the present invention and the description thereof are used to explain the present invention without unduly limiting the present invention. In the drawings.

DETAILED DESCRIPTION OF EMBODIMENTS

Function Summary

In consideration of the problems that the system performance is affected when the same DCI uses the same CCE aggregation level L in different cell bandwidths and how to allocate the idle CCE resource is not clear in the related art, a solution for allocating a CCE is provided by the present invention. In the solution, the same DCI may use different CCE aggregation levels L in different cell downlink bandwidths under the condition of the same downlink link quality (i.e., wideband CQI), so the receiving performance (such as coding success rate) of the UE is not affected, and thereby the problem that the same DCI may use the same CCE aggregation level L in different cell downlink bandwidths as well as the problem of how to allocate the idle CCE resource in the PDCCH candidate area (i.e., the CCE resource corresponding to the number of the PDCCH candidates $M^{(L)}$) are solved, and compared with the conventional CCE allocation technology, the solution further improves the utilization rate of the CCE resource.

The present invention will be described below with reference to the drawings and in conjunction with the embodiments in detail. It should be noted that, in the case of no conflict, the embodiments of the present invention and features thereof can be combined with each other.

Method Embodiment

According to one embodiment of the present invention, a method for allocating a CCE is provided.

Figure 1:
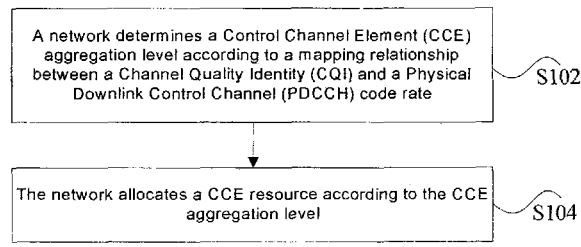
FIG. 1 is a flow chart of a method for allocating a CCE according to one embodiment of the present invention.

FIG. 1 is a flow chart of a method for allocating a CCE according to one embodiment of the present invention. As shown in FIG. 1, the method comprises the steps from S102 to S104 as follows.

Step 102: a network determines a CCE aggregation level according to a mapping relationship between a CQI and a PDCCH code rate.

Step 104: the network allocates a CCE resource according to the CCE aggregation level.

In the above, the PDCCH code rate is the value obtained by dividing the bits of the DCI information born on the PDCCH (containing the own bits of the DCI and Cyclic Redundancy Check (CRC) bits) by the bearable bits of the PDCCH.

The allocation of the CCE comprises the allocation of the CCE resource to the public DCI and the allocation of the CCE resource to the DCI of the UE, which are respectively described below.

To the Public DCI

The step of the network determining the CCE aggregation level according to the mapping relationship between the CQI and the PDCCH code rate comprises the steps as follows: the network selects a corresponding first PDCCH code rate for the public DCI according to the mapping relationship and a minimum wideband CQI of all the activated UEs in a cell at the current TTI, wherein, according to the mapping relationship between the CQI and the PDCCH code rate, the first PDCCH code rate is the first minimum PDCCH code rate corresponding to the minimum wideband CQI of all the activated UEs in the cell at the current TTI, and then the network selects a first CCE aggregation level Lcommin from a CCE aggregation level set {4, 8} for the public DCI at the current TTI according to the corresponding first PDCCH code rate. The first CCE aggregation level corresponds to the first PDCCH code rate and is the minimum in the CCE aggregation level set {4, 8} at the current TTI.

The step of the network allocating the CCE resource according to the CCE aggregation level comprises the steps as follows: the network extracts a piece of public DCI from the public DCI scheduling queue at the current TTI; and the network allocates the CCE resource by using the first CCE aggregation level corresponding to the extracted public DCI.

The principle of allocating the public CCE in the public CCE area is: determining the CCE resource used by the public DCI by using the CCE aggregation level and the information of using CCE in the public CCE area.

To the DCI of the UE, i.e., the private DCI.

The step of the network determining the CCE aggregation level according to the mapping relationship between the CQI and the PDCCH code rate comprises the steps as follows: the network selects a corresponding second PDCCH code rate for the corresponding UE according to the mapping relationship, and selects a needed second CCE aggregation level Luemin for the DCI, which will be allocated to the UE at the current TTI, of the CCE resource, according to the corresponding second PDCCH code rate; and then, the available CCE aggregation level of the DCI is determined, i.e., all the values greater than or equal to the second CCE aggregation level Luemin are extracted from a CCE aggregation level set {1, 2, 4, 8} to compose a CCE aggregation level set {Luemin, . . . , 8} corresponding to the DCI, wherein the second CCE aggregation level corresponds to the second PDCCH code rate and is the minimum CCE aggregation level selected and needed by the DCI to which the CCE resource will be allocated at the current TTI.

The step of the network allocating the CCE resource according to the CCE aggregation level comprises the steps as follows: the network extracts DCI of a UE from the UE scheduling queue at the current TTI, selects a CCE aggregation level from the CCE aggregation level set corresponding to the DCI of the UE, and allocates the CCE resource to the DCI of the UE by using the selected CCE aggregation level.

The principle of allocating the CCE resource in the PDCCH candidate area is: determining the CCE resource used by the DCI of the UE by using the CCE aggregation level, the location of the PDCCH candidate area, the quantity of the allocable CCE resource in the PDCCH candidate area, the use condition of the CCE resource, the residual CCE resource and other information.

The implementations of the embodiments of the present invention will be described below in conjunction with the examples in detail.

For the public DCI, the network selects a proper PDCCH code rate for corresponding public DCI at the current TTI according to a mapping relationship between a CQI and a PDCCH code rate, and also selects a needed CCE aggregation level Lcommin for the public DCI, and then, the network determines the CCE resource used by the public DCI by using the CCE aggregation level and the information of using CCE in the public CCE area.

Figure 2:
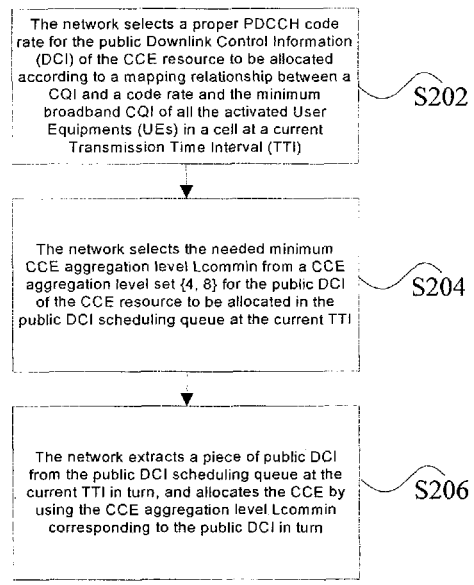
FIG. 2 is a flow chart of a method for allocating a CCE resource to a piece of public DCI by a network according to one embodiment of the present invention.

FIG. 2 is a flow chart of a method for allocating a CCE resource to a piece of public DCI by a network according to one embodiment of the present invention. As shown in FIG. 2, the method comprises the steps from S202 to S206 as follows.

Step S202: the network selects a proper PDCCH code rate for the public DCI according to a mapping relationship between a CQI and a PDCCH code rate and a minimum wideband CQI of all the activated UEs in a cell at the current TTI, wherein, according to the mapping relationship between the CQI and the PDCCH code rate, the PDCCH code rate is the minimum PDCCH code rate corresponding to the minimum wideband CQI of all the activated UEs in the cell at the current TTI.

Step S204: the network selects the needed minimum CCE aggregation level Lcommin from a CCE aggregation level set {4, 8} for the public DCI at the current TTI according to the PDCCH code rate selected for the public DCI.

Step S206: for each public DCI, a piece of public DCI is extracted from the public DCI scheduling queue at the current TTI in turn to carry out the following processing: the CCE is allocated by using the CCE aggregation level Lcommin corresponding to the public DCI in turn.

For the UE, the network selects the proper PDCCH code rate for the DCI of the CCE resource, which will be allocated to the corresponding UE at the current TTI, according to the mapping relationship between the CQI and the PDCCH code rate, and also selects a needed CCE aggregation level set {Luemin, . . . , 8} for the DCI, and then the network determines the CCE resource used by the DCI of the UE according to the CCE aggregation level, the location of the PDCCH candidate area, the quantity of the allocable CCE resource in the PDCCH candidate area, the use condition of the CCE in the PDCCH candidate area and other information.

Figure 3:
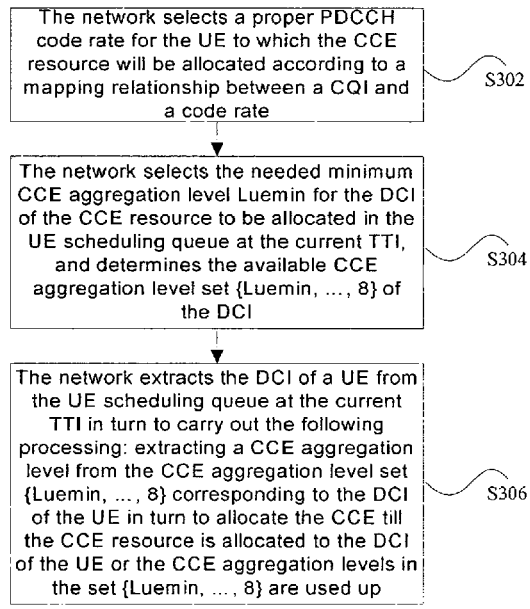
FIG. 3 is a flow chart of a method for allocating a CCE resource to the DCI of a UE by a network according to one embodiment of the present invention.

FIG. 3 is a flow chart of a method for allocating a CCE resource to the DCI of a UE by a network according to one embodiment of the present invention. As shown in FIG. 3, the method comprises the steps from S302 to S306 as follows.

Step S302: the network selects a proper PDCCH code rate for the corresponding UE according to a mapping relationship between a CQI and a PDCCH code rate.

Step S304: the network selects the needed minimum CCE aggregation level Luemin for the DCI of the CCE resource, which will be allocated to the UE at the current TTI, according to the PDCCH code rate selected for the UE, and determines the available CCE aggregation level of the DCI, i.e., all the values greater than or equal to the Luemin are extracted from a CCE aggregation level set {1, 2, 4, 8} to compose a set {Luemin, . . . , 8}.

Step S306: for the DCI of each UE, the DCI of a UE is extracted from the UE scheduling queue at the current TTI in turn to carry out the following processing: a CCE aggregation level is extracted from the CCE aggregation level set {Luemin, ..., 8} corresponding to the DCI of the UE in turn to allocate the CCE till the CCE resource is allocated to the DCI of the UE or all the CCE aggregation levels in the set {Luemin, ..., 8} are used up.

The network may be an Evolved NodeB (eNB).

Figure 4:
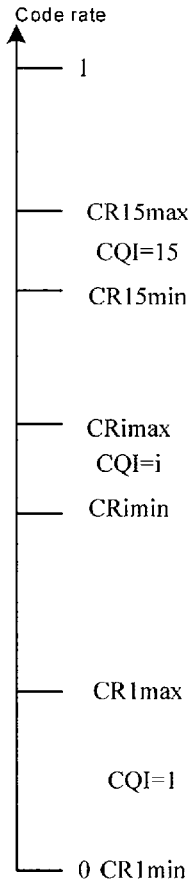
FIG. 4 is a schematic diagram of a mapping relationship between a CQI and a PDCCH code rate according to one embodiment of the present invention.

The mapping relationship between the CQI and the PDCCH code rate is the allowable PDCCH code rate range of the corresponding CQI under the condition that the block error rate of the PDCCH is less than or equal to the block error rate threshold A, wherein the PDCCH code rate is the value obtained by dividing the bits of the DCI born on the PDCCH (containing the own bits of the DCI and Cyclic Redundancy Check (CRC) bits) by the bearable bits of the PDCCH. Generally, the block error rate threshold A of the PDCCH is 1%. FIG. 4 is a schematic diagram of a mapping relationship between a CQI and a PDCCH code rate according to one embodiment of the present invention. As shown in FIG. 4, the vertical coordinate represents the PDCCH code rate, and each CQI value corresponds to a range of code rate values, for example, the Code Rate (CR) corresponding to CQI, 1 is [CR1min,CR1max] (i.e., the code rate corresponding to the CQI, 1, is greater than or equal to CR1min and less than CR1 max); the CR corresponding to CQI, I is [CRimin, CRimax); and the CR corresponding to CQI, 15 is [CR15 min, CR15max).

In a certain bandwidth configuration (which is a cell downlink bandwidth for a Frequency Division Duplex (FDD) way, or a cell bandwidth for a Time Division Duplex (TDD) way), for a certain DCI, there are different PDCCH code rates in the different CCE aggregation levels, and the greater the CCE aggregation level is, the less the code rate is.

For each public DCI, at the current TTI, the maximum PDCCH code rate CRcomimax needed by the public DCI at the TTI is obtained according to the minimum CQI value CQImin of all the activated UEs in the cell and the mapping relationship between the CQI and the PDCCH code rate, wherein the CQImin is greater than or equal to 1, and less than or equal to 15.

The minimum CCE aggregation level Lcommin needed by the public DCI is determined according to the CRcomimax and the PDCCH code rates of the public DCI in different CCE aggregation levels, wherein the CCE aggregation levels for the public DCI in different CCE aggregation levels are the CCE aggregation level 4 or 8.

The principle of allocating the CCE by using the CCE aggregation level is: determining the CCE resource used by the public DCI by using the CCE aggregation level and the information of using CCE in the public CCE area.

The CCE resource is allocated to the public DCI under 3 conditions as follows.

1) If there is no allocable CCE resource for the used CCE aggregation level Lcommin in the public CCE area, the CCE resource allocation for the public DCI is ended.

2) If there is only one block of allocable CCE resource for the used CCE aggregation level Lcommin in the public CCE area, the CCE resource is allocated to the public DCI.

3) If there are multiple blocks of allocable CCE resource for the used CCE aggregation level Lcommin in the public CCE area, the processing steps are as follows.

Step 1: It is judged whether the used CCE aggregation level Lcommin is 4 or 8. If the used CCE aggregation level Lcommin is 8, the boundary CCE resource CCE0-CCE7 is allocated to the public DCI, and the flow is ended; and if the used CCE aggregation level Lcommin is 4, Step 2 is executed.

Step 2: If there is a head boundary CCE in the multiple blocks of allocable CCE resource of the public CCE area (i.e., the allocable CCE resource contain CCE0), the CCE resource is allocated to the public DCI, otherwise, the CCE is allocated by an even rule in order that the used CCE are allocated to the whole CCE resource as evenly as possible.

Figure 5:
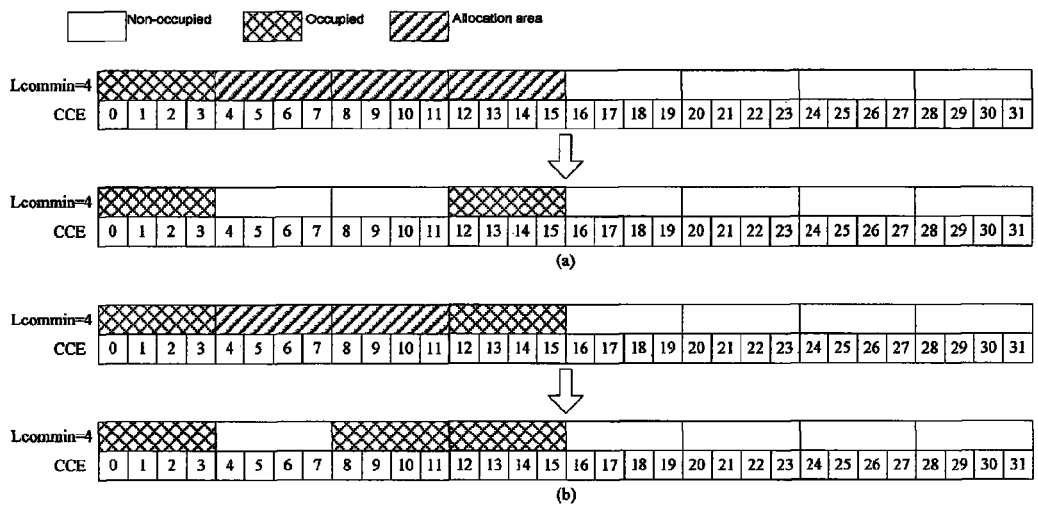
FIG. 5 is a schematic diagram of the allocation of a CCE resource to a piece of public DCI according to one embodiment of the present invention.

For example, FIG. 5 is a schematic diagram of the allocation of a CCE resource to a piece of public DCI according to one embodiment of the present invention. As shown in FIG. 5, in FIG. 5(a), the CCE aggregation level Lcommin used by a certain public DCI is 4; there are three blocks of allocable CCE resource in the current available public CCE area: CCE4-CCE7, CCE8-CCE11, and CCE12-CCE15; and according to the even rule, the CCE resource CCE12-CCE15 is allocated to the public DCI.

For another example, in FIG. 5(b), the CCE aggregation level Lcommin used by a certain public DCI is 4; there are two blocks of allocable CCE resource in the current available public CCE area: CCE4-CCE7 and CCE8-CCE11, and according to the even rule, the CCE resource CCE8-CCE11 is allocated to the public DCI.

It should be noted that the allocation area in FIG. 5 represents the allocable CCE resource in the public CCE area.

The processing is completed.

For the DCI of each UE in the scheduling queue, at the current TTI, the maximum PDCCH code rate CRimax needed by the UE at the current TTI is obtained according to the CQI value i of each UE in the scheduling queue and the mapping relationship between the CQI and the PDCCH code rate, wherein i is greater than or equal to 1 and less than or equal to 15.

According to the CRimax and the PDCCH code rates of the DCI of the UE in different CCE aggregation levels, the minimum CCE aggregation level Luemin needed by the DCI of the UE is determined, and the available CCE aggregation levels of the DCI are determined, i.e., all the values greater than or equal to the Luemin are extracted from a CCE aggregation level set {1, 2, 4, 8} to compose a set {Luemin, ..., 8}, wherein the PDCCH code rate of the DCI is less than or equal to CRimax when the CCE aggregation level is Luemin.

One CCE aggregation level is extracted from the set {Luemin, ..., 8} in turn to allocate the CCE till the CCE resource is allocated to the DCI of the UE or the CCE aggregation levels in the set {Luemin, ..., 8} are used up. The principle of allocating the CCE resource in the PDCCH candidate area is: determining the CCE resource to be used by the DCI of the UE by using the CCE aggregation level, the location of the PDCCH candidate area, the quantity of the allocable CCE resource in the PDCCH candidate area, the use condition of the CCE around the PDCCH candidate area and other information.

The CCE resource is allocated to the DCI of the UE under the following 3 conditions:

1) If there is no allocable CCE resource in the PDCCH candidate area calculated by using the CCE aggregation level L, it is judged whether there are some idle CCE aggregation levels in the set {Luemin, ..., 8}; if so, the CCE resource is allocated by using the idle CCE aggregation levels in turn; and if not, the allocation of the CCE resource to the DCI is ended.

2) If there is only one block of allocable CCE resource in the PDCCH candidate area calculated by using the CCE aggregation level L, the CCE resource is allocated to the DCI of the UE.

3) If, there are multiple blocks of allocable CCE resource in the PDCCH candidate area calculated by using the CCE aggregation level L, the processing steps are as follows.

Step 1: It is judged whether the number of PDCCH candidates is greater than a threshold B; if it is less than or equal to the threshold B, Step 2 is executed; and if it is greater than the threshold B, Step 3 is executed. Generally, the threshold B is 2.

Step 2: The CCE is allocated according to the even rule in order that the used CCE is allocated to the whole CCE resource as evenly as possible.

Figure 6:
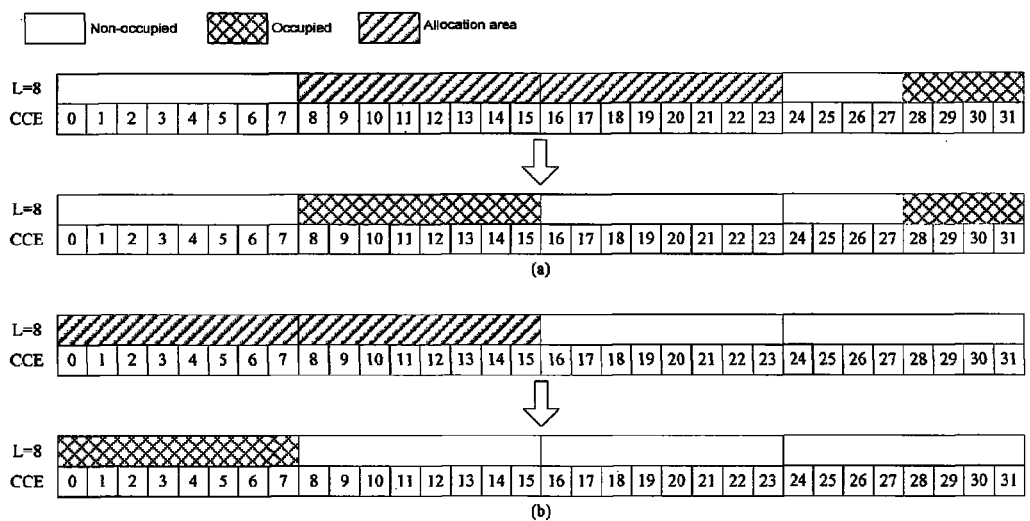
FIG. 6 is a schematic diagram of the allocation of a CCE resource with the CCE aggregation level of 8 to the DCI of a UE according to one embodiment of the present invention.

For example, if the CCE aggregation level of 8 and the corresponding number of PDCCH candidates is 2 which are not occupied, it is judged whether the CCE of the same CCE aggregation level L at the two ends connected with the PDCCH candidate area are occupied (comprising two cases: completely occupied and partially occupied). If only the CCE at one end is occupied, the CCE adjacent to the non-occupied CCE is allocated to the DCI of the UE. FIG. 6 is a schematic diagram of the allocation of a CCE resource with the CCE aggregation level of 8 to the DCI of a UE according to one embodiment of the present invention. As shown in FIG. 6($a$), a certain UE uses the CCE aggregation level L of 8 to allocate the CCE to the DCI thereof. In the CCE resource CCE8-CCE23 in the PDCCH candidate area, there are two blocks of allocable CCE resource: CCE8-CCE15 and CCE16-CCE23; and meanwhile, the CCE resource CCE28-CCE31 adjacent to the CCE resource CCE16-CCE23 is occupied. Therefore, the CCE resource CCE8-CCE15 are allocated to the DCI of the UE.

For another example, if the CCE at the two ends are not occupied, it is further judged whether the CCE of the same CCE aggregation level L at the two ends secondarily connected with the PDCCH candidate area are occupied. If only the CCE at one end is occupied, the CCE adjacent to the non-occupied CCE is allocated to the DCI of the UE; and the judgment is carried out sequentially according to the above method till the desired judgment result is obtained.

For another example, if the CCE at the two ends are occupied, it is further judged whether the CCE of the same CCE aggregation level L at the two ends secondarily connected with the PDCCH candidate area are occupied. If only the CCE at one end is occupied, the CCE adjacent to the non-occupied CCE is allocated to the DCI of the UE. The judgment is carried out sequentially according to the above method till the desired judgment result is obtained.

It should be noted that if there is boundary CCE resource, the idle boundary CCE resource is preferably allocated. As shown in FIG. 6($b$), a certain UE uses the CCE aggregation level L of 8 to allocate a CCE to the DCI thereof; in the CCE resource CCE8-CCE23 in the PDCCH candidate area, there are two blocks of allocable CCE resource: CCE0-CCE7 and CCE8-CCE15; and meanwhile, the CCE resource CCE0-CCE7 is the boundary CCE resource. Therefore, the CCE resource CCE0-CCE7 is allocated to the DCI of the UE.

It should be noted that the allocation area in FIG. 6 represents the allocable CCE resource in the PDCCH candidate area calculated by the used CCE aggregation level L.

Step 3: The CCE is allocated according to an aggregation even method, i.e., the following two aspects are considered: for one aspect, evenness, i.e., the used CCE is allocated in the whole CCE resource as evenly as possible, and for the other aspect, aggregation, i.e., the used CCE occupy the CCE resource to be occupied by one or some certain CCE aggregation levels as fully as possible.

Generally, when there is a block of idle CCE resource having the same CCE aggregation level as that of this level in the PDCCH candidate area, wherein the idle CCE resource and the associated and occupied CCE resource (comprising partially occupied and completely occupied) constitute the resource with the CCE aggregation level of one level higher, the second aspect is preferably considered, i.e., the aggregation is preferably considered, i.e., the idle CCE resource is preferably allocated.

Figure 7:
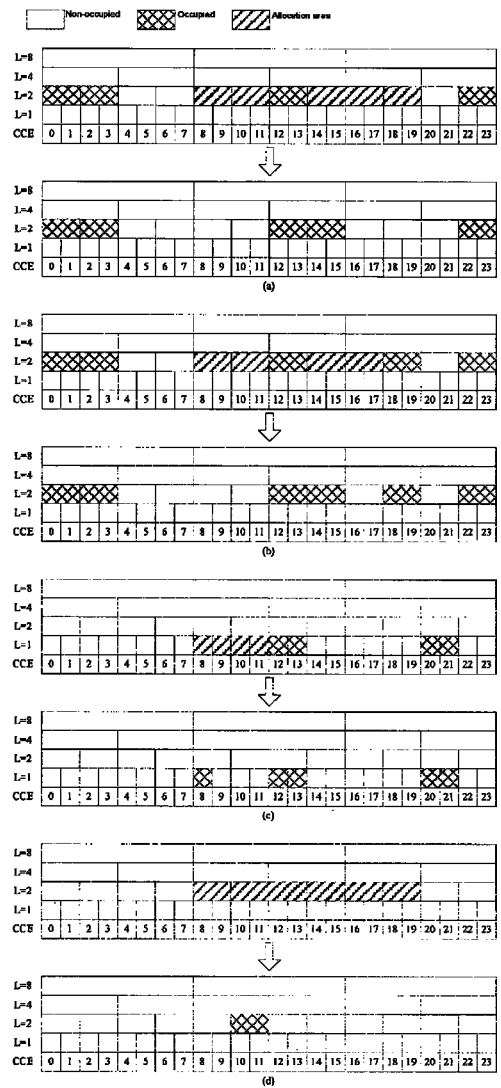
FIG. 7 is a schematic diagram of the allocation of a CCE resource with the CCE aggregation level of 1 and 2 to the DCI of a UE according to one embodiment of the present invention.

FIG. 7 is a schematic diagram of the allocation of a CCE resource with the CCE aggregation level of 1 and 2 to the DCI of a UE according to one embodiment of the present invention, and as shown in FIG. 7($a$).

Furthermore, when there are multiple blocks of idle CCE resource having the same CCE aggregation level as that of this level in the PDCCH candidate area, wherein the idle CCE resource and the associated and occupied CCE resource (comprising partially occupied and completely occupied) constitute the resource with the CCE aggregation level of one level higher, the idle CCE resource is further judged according to the even rule, and as shown in FIG. 7($b$).

Furthermore, when there is no idle CCE resource having the same CCE aggregation level as that of this level in the PDCCH candidate area, wherein the idle CCE resource and the associated and occupied CCE resource (comprising partially occupied and completely occupied) constitute the resource with the CCE aggregation level of one level higher, the idle CCE resource in the PDCCH candidate area is judged according to the even rule, and as shown in FIG. 7($c$).

Furthermore, when it is judged that there are multiple blocks of idle CCE resource in the PDCCH candidate area according to the even rule, any one of these idle CCE resource is allocated. As shown in FIG. 7($d$), any of the CCE resource blocks CCE10-CCE11 and CCE12-CCE13 may be allocated according to the even rule. The CCE resource CCE10-CCE11 is allocated in FIG. 7($d$).

It should be noted that the allocation area in FIG. 7 represents the allocable CCE resource in the PDCCH candidate area calculated by the used CCE aggregation level L.

The processing is completed.

Device Embodiment

According to one embodiment of the present invention, a device for allocating a CCE is provided.

Figure 8:
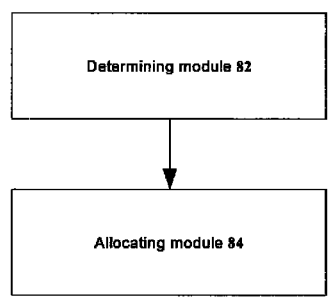
FIG. 8 is a structural block diagram of a device for allocating a CCE according to one embodiment of the present invention.

FIG. 8 is a structural block diagram of a device for allocating a CCE according to one embodiment of the present invention. As shown in FIG. 8, the device comprises: a determining module 82, and an allocating module 84, which are described below in detail.

The determining module 82 is configured to determine a CCE aggregation level according to a mapping relationship between a CQI and a PDCCH code rate; and the allocating module 84 is connected to the determining module 82 and configured to allocate a CCE resource according to the CCE aggregation level.

Figure 9:
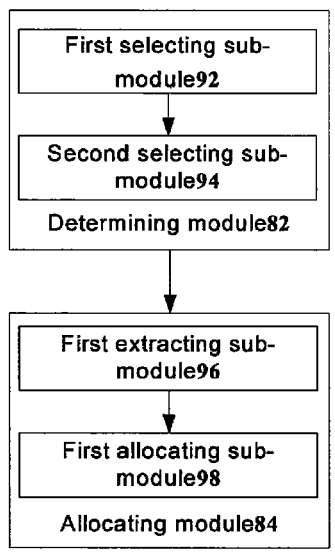
FIG. 9 is a structural block diagram of a specific device for allocating a CCE according to one embodiment of the present invention.

FIG. 9 is a structural block diagram of a specific device for allocating a CCE according to one embodiment of the present invention. As shown in FIG. 9, the determining module 82 comprises: a first selecting sub-module 92, and a second selecting sub-module 94, which are described below in detail.

The first selecting sub-module 92 is configured to select a corresponding first PDCCH code rate for public DCI according to the mapping relationship and a minimum wideband CQI of all the activated UEs in a cell at a current TTI, wherein the first PDCCH code rate is the first minimum PDCCH code rate needed by the minimum wideband CQI of all the activated UEs in the cell at the current TTI according to the mapping relationship between the CQI and the PDCCH code rate; and the second selecting sub-module 94 is connected to the first selecting sub-module 92 and configured to select a corresponding first CCE aggregation level from a CCE aggregation level set {4, 8} for the public DCI at the current TTI according to the corresponding first PDCCH code rate. The first CCE aggregation level corresponds to the first PDCCH code rate and is the minimum one in the CCE aggregation level set {4, 8} at the current TTI.

The allocating module 84 comprises: a first extracting sub-module 96, and a first allocating sub-module 98, which are described below in detail.

The first extracting sub-module 96 is configured to extract a piece of public DCI from a public DCI scheduling queue at the current TTI; and the first allocating sub-module 98 is connected to the first extracting sub-module 96 and configured to allocate the CCE resource by using the first CCE aggregation level corresponding to the extracted public DCI.

Figure 10:
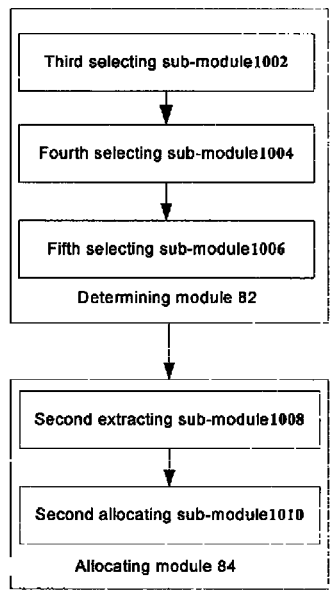
FIG. 10 is a structural block diagram of another specific device for allocating a CCE according to one embodiment of the present invention.

FIG. 10 is a structural block diagram of another specific device for allocating a CCE according to one embodiment of the present invention. As shown in FIG. 10, the determining moduel 82 comprises: a third selecting sub-module 1002, a fourth selecting sub-module 1004 and a fifth selecting sub-module 1006, which are described below in detail.

The third selecting sub-module 1002 is configured to select a corresponding second PDCCH code rate for a corresponding UE according to the mapping relationship (i.e., the mapping relationship between the CQI and the PDCCH code rate); the fourth selecting sub-module 1004 is connected to the third selecting sub-module 1002 and configured to select a needed second CCE aggregation level for the DCI of the CCE resouce, which will be allocated to the UE at the current TTI, according to the corresponding second PDCCH code rate; and the fifth selecting sub-module 1006 is connected to the fourth selecting sub-module 1004 and configured to select values greater than or equal to the second CCE aggregation level from a CCE aggregation level set {1, 2, 4, 8} as the CCE aggregation level set corresponding to the UE. The second CCE aggregation level corresponds to the second PDCCH code rate and is the minimum one selected and needed by the DCI of the CCE resouce to be allocated at the current TTI.

The allocating module 84 comprises: a second extracting sub-module 1008 and a second allocating sub-module 1010, which are described below in detail.

The second extracting sub-module 1008 is configured to extract the DCI of a UE from a UE scheduling queue at the current TTI, and the second allocating sub-module 1010 is connected to the second extracting sub-module 1008 and configured to select a CCE aggregation level from the CCE aggregation level set corresponding to the extracted DCI of the UE to allocate the CCE resource to the extracted DCI of the UE.

Figure 11:
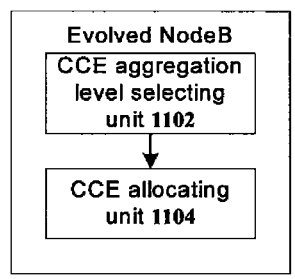
FIG. 11 is a schematic structural diagram of a device for allocating a CCE resource according to one embodiment of the present invention.

A device for allocating a CCE is further provided by the present invention. FIG. 11 is a schematic structural diagram of a device for allocating a CCE according to one embodiment of the present invention, and the device for allocating the CCE is located in the network. The device in the embodiment may be specifically an eNB, and the device comprises a CCE aggregation level selecting unit 1102 and a CCE allocating unit 1104, wherein the CCE aggregation level selecting unit 1102 corresponds to the determining module 82 and configured to select a needed minimum CCE aggregation level Lcommin from a CCE aggregation level set {4, 8} for the public DCI at the current TTI according to the mapping relationship between the CQI and the PDCCH code rate, and select a needed minimum CCE aggregation level Luemin for the DCI of the CCE resource, which will be allocated to a UE at the current TTI, and determine the available CCE aggregation level of the DCI, i.e., extract all the values greater than or equal to Luemin from a CCE aggregation level set {1, 2, 4, 8} to compose a set {Luemin, ..., 8}; and the CCE allocating unit 1104 corresponds to the allocating module 84 and is configured to extract a piece of public DCI in turn from a public DCI scheduling queue at the current TTI to carry out the following processing: allocating the CCE by using the CCE aggregation level Lcommin corresponding to the public DCI in turn, and for the DCI of each UE, extracting the DCI of a UE from the UE scheduling queue at the current TTI in turn to carry out the following processing: extracting a CCE aggregation level from the CCE aggregation level set {Luemin, ..., 8} corresponding to the DCI of the UE to allocate the CCE till the CCE resource is allocated to the DCI of the UE or all the CCE aggregation levels in the set {Luemin, ..., 8} are used up.

It should be noted that the device for allocating the CCE described in the device embodiments corresponds to the method embodiments, with the specific implementation described in the method embodiments in detail, and thereby no further description is needed.

To sum up, through the present invention, the utilization rate of the CCE resource is improved.

It should be noted that the steps shown in the flow chart of the drawings can be executed, for example, in the computer system of a set of computer executable instructions. In addition, a logic order is shown in the flow chart, but the shown or described steps can be executed in a different order under some conditions.

Obviously, those skilled in the art shall understand that each module or each step of the present invention may be implemented by general calculating device and centralized in a single calculating device or allocated in a network consisting of multiple computing devices. Optionally, the modules or steps may be implemented by using executable program codes of the computing devices. Consequently, they may be stored in a storage device to be executed by the calculating device, or respectively made into integrated circuit modules or a single integrated circuit module. In this way, the present invention is not limited to any specific combination of hardware and software.

The descriptions above are only preferred embodiments of the present invention and not used for limiting the present invention. For those skilled in the art, the present invention may have various modifications and changes. Any modifications, equivalent replacements, improvements and the like within the spirit and principle of the present invention shall fall within the scope of protection of the present invention.

What is claimed is:

1. A method for allocating a Control Channel Element (CCE), comprising:
   determining a CCE aggregation level, by a network, according to a mapping relationship between a Channel Quality Identity (CQI) and a Physical Downlink Control Channel (PDCCH) code rate; and
   allocating the CCE resource according to the CCE aggregation level by the network,
   wherein the step of determining the CCE aggregation level by the network according to the mapping relationship comprises:
   selecting a corresponding first PDCCH code rate for public Downlink Control Information (DCI), by the network, according to the mapping relationship and a minimum wideband CQI of all the activated User Equipments (UEs) in a cell at a current Transmission Time Interval (TTI); and
   selecting a corresponding first CCE aggregation level from a CCE aggregation level set {4, 8} for the public DCI at the current TTI, by the network, according to the corresponding first PDCCH code rate, wherein the first CCE aggregation level corresponds to the first PDCCH code rate.

2. The method according to claim 1, wherein the step of allocating the CCE resource according to the CCE aggregation level by the network comprises:
   extracting a piece of public DCI from a public DCI scheduling queue at the current TTI by the network, and
   allocating the CCE resource by using the first CCE aggregation level corresponding to the extracted public DCI by the network.

3. The method according to claim 1, wherein the step of determining the CCE aggregation level according to the mapping relationship by the network comprises:
   selecting a corresponding second PDCCH code rate for a corresponding User Equipment (UE) according to the mapping relationship by the network;
   selecting a needed second CCE aggregation level for DCI of a CCE resource, which will be allocated to the UE at a current TTI, by the network, according to the corresponding second PDCCH code rate, wherein the second CCE aggregation level corresponds to the second PDCCH code rate; and
   selecting values greater than or equal to the second CCE aggregation level from a CCE aggregation level set {1, 2, 4, 8} as a CCE aggregation level set corresponding to the UE, by the network.

4. The method according to claim 3, wherein the step of allocating the CCE resource according to the CCE aggregation level by the network comprises:
   extracting DCI of a UE from a UE scheduling queue at the current TTI by the network; and
   selecting a CCE aggregation level from a CCE aggregation level set corresponding to the extracted DCI of the UE to allocate the CCE resource to the extracted DCI of the UE by the network.

5. A device for allocating a Control Channel Element (CCE), which is located in a network, comprising:
   a determining module, configured to determine a CCE aggregation level according to a mapping relationship between a CQI and a PDCCH code rate, and
   an allocating module, configured to allocate the CCE resource according to the CCE aggregation level,
   wherein the determining module comprises:
   a first selecting sub-module, configured to select a corresponding first PDCCH code rate for public DCI according to the mapping relationship and a minimum wideband CQI of all the activated UEs in a cell at a current TTI; and
   a second selecting sub-module, configured to select a corresponding first CCE aggregation level from a CCE aggregation level set {4, 8} for the public DCI at the current TTI according to the corresponding first PDCCH code rate, wherein the first CCE aggregation level corresponds to the first PDCCH code rate.

6. The device according to Claim 5, wherein the allocating module comprises:
   a first extracting sub-module, configured to extract a piece of public DCI from a public DCI scheduling queue at the current TTI; and
   a first allocating sub-module, configured to allocate the CCE resource by using the first CCE aggregation level corresponding to the extracted public DCI.

7. The device according to claim 5, wherein the determining module comprises:
   a third selecting sub-module, configured to select a corresponding second PDCCH code rate for a corresponding UE according to the mapping relationship;
   a fourth selecting sub-module, configured to select a needed second CCE aggregation level for the DCI of a CCE resource, which will be allocated to the UE at a current TTI, according to the corresponding second PDCCH code rate, wherein the second CCE aggregation level corresponds to the second PDCCH code rate; and
   a fifth selecting sub-module, configured to select values greater than or equal to the second CCE aggregation level from a CCE aggregation level set {1, 2, 4, 8} as a CCE aggregation level set corresponding to the UE.

8. The device according to claim 7, wherein the allocating module comprises:
   a second extracting sub-module, configured to extract DCI of a UE from a UE scheduling queue at the current TTI; and
   a second allocating sub-module, configured to select a CCE aggregation level from a CCE aggregation level set corresponding to the extracted DCI of the UE to allocate the CCE resource to the extracted DCI of the UE.

* * * * *